(12) United States Patent
Sachdev et al.

(10) Patent No.: US 10,282,747 B2
(45) Date of Patent: May 7, 2019

(54) USING USER SEGMENTS FOR TARGETED CONTENT

(71) Applicant: Adobe Inc., San Jose, CA (US)

(72) Inventors: Anil Sachdev, San Jose, CA (US);
Thomas Greger, Lehi, UT (US);
Brandon Pack, Sandy, UT (US)

(73) Assignee: Adobe Inc., San Jose, CA (US)

( * ) Notice: Subject to any disclaimer, the term of this patent is extended or adjusted under 35 U.S.C. 154(b) by 587 days.

(21) Appl. No.: 14/728,354

(22) Filed: Jun. 2, 2015

(65) Prior Publication Data
US 2016/0358206 A1 Dec. 8, 2016

(51) Int. Cl.
*G06Q 30/00* (2012.01)
*G06Q 30/02* (2012.01)

(52) U.S. Cl.
CPC ..... *G06Q 30/0245* (2013.01); *G06Q 30/0255* (2013.01); *G06Q 30/0277* (2013.01)

(58) Field of Classification Search
USPC .......... 705/14.19; 382/103; 345/440
See application file for complete search history.

(56) References Cited

U.S. PATENT DOCUMENTS

| | | | | |
|---|---|---|---|---|
| 6,167,358 A * | 12/2000 | Othmer | | G06F 11/0748 702/188 |
| 8,051,491 B1 * | 11/2011 | Cavage | | G06F 21/6218 726/30 |
| 8,330,759 B1 * | 12/2012 | Besbeas | | G06Q 30/06 345/440 |
| 2002/0174426 A1 * | 11/2002 | Gutta | | G11B 19/08 725/30 |
| 2004/0002896 A1 * | 1/2004 | Alanen | | G06Q 30/0253 705/14.51 |
| 2006/0265397 A1 * | 11/2006 | Bryan | | G06F 17/3089 |
| 2007/0112740 A1 * | 5/2007 | Geva | | G06F 17/30864 |
| 2008/0098062 A1 * | 4/2008 | Balia | | G06F 17/30867 709/203 |
| 2008/0219239 A1 * | 9/2008 | Bell | | H04L 12/4625 370/351 |
| 2009/0164287 A1 * | 6/2009 | Kies | | G06Q 30/0277 705/1.1 |

(Continued)

FOREIGN PATENT DOCUMENTS

JP 2001101190 A * 4/2001

*Primary Examiner* — Matthew T Sittner
(74) *Attorney, Agent, or Firm* — Kilpatrick Townsend & Stockton LLP

(57) ABSTRACT

Techniques for providing content to a computing device of a user are described. For example, a platform hosts a plurality of tools includes an analytics tool and a content tool. Input of a customer of the platform is received and specifies user segments and content to be provided accordingly. The tools are updated based on the customer input. User interactions of the user are also received and analyzed by, for example, the analytics tool. The analytics tool outputs an indication that the user is associated with a user segment based on the analysis. The output identifies the user segment and the user based on a format usable by the other tools. In turn, the content tool automatically receives and uses the output as an input to determine the content and the target of the content. Accordingly, the content tool provides the content to the computing device of the user.

20 Claims, 9 Drawing Sheets

(56) References Cited

U.S. PATENT DOCUMENTS

| | | | | |
|---|---|---|---|---|
| 2010/0003967 A1* | 1/2010 | Datta | H04W 4/00 | 455/412.1 |
| 2010/0064341 A1* | 3/2010 | Aldera | H04L 63/102 | 726/1 |
| 2010/0257264 A1* | 10/2010 | Assadzadeh | H04L 29/06 | 709/223 |
| 2011/0119729 A1* | 5/2011 | Bergeson | G06F 9/5061 | 726/1 |
| 2011/0276951 A1* | 11/2011 | Jain | G06F 11/3006 | 717/140 |
| 2012/0101952 A1* | 4/2012 | Raleigh | G06Q 30/016 | 705/304 |
| 2012/0253905 A1* | 10/2012 | Darragh | G06Q 30/00 | 705/14.19 |
| 2012/0324196 A1* | 12/2012 | Maillet | G06F 9/5016 | 711/170 |
| 2013/0124567 A1* | 5/2013 | Balinsky | G06F 17/30011 | 707/783 |
| 2013/0227636 A1* | 8/2013 | Bettini | H04W 12/12 | 726/1 |
| 2013/0346943 A1* | 12/2013 | Bharatia | G06F 9/448 | 717/117 |
| 2014/0143688 A1* | 5/2014 | Hou | G06F 3/0488 | 715/760 |
| 2014/0172888 A1* | 6/2014 | Odenheimer | G06F 17/30557 | 707/756 |
| 2014/0177907 A1* | 6/2014 | Argue | G06T 7/0002 | 382/103 |
| 2014/0189861 A1* | 7/2014 | Gupta | H04L 63/08 | 726/22 |
| 2014/0282833 A1* | 9/2014 | Boyer | G06F 21/57 | 726/1 |
| 2014/0379481 A1* | 12/2014 | Gupta | G06Q 30/0269 | 705/14.66 |

* cited by examiner

USING USER SEGMENTS FOR TARGETED CONTENT

TECHNICAL FIELD

This disclosure relates generally to techniques for providing content to computer devices.

BACKGROUND

Users are turning to online tools to access various types of services. User interactions with the services are often tracked and analyzed. Generally, the analysis is used to improve the services and/or to customize some of the services to the users. For example, interactions of a user with a product's web site are tracked. An interest of the user in a particular product is accordingly estimated. An advertisement for the product is selected based on this interest. Subsequently, when the user returns to the same web site or visits a different web site, the advertisement is inserted in the accessed web site. In this example, tracking and analyzing the user interactions can facilitate targeted advertisement.

Previous techniques for improving various services based on tracked user interactions can be complex. For example, in the context of targeted advertisement, the techniques involve two entities: analysts and marketers. The analysts frequently classify different types of visitors to web sites into buckets or categories, often referred to as segments. The marketers often choose which dimensions or demographics are to be used in segmenting the visitors and the advertisements to be provided to each segment.

However, the analysts and the marketers traditionally use disparate tools. The analysts use analysis and reporting tools. In comparison, the marketers use a digital advertising platform such as a search engine or banner advertisement platform. To provide targeted advertisements, the marketers often need to export and reformat data generated by the analysts into tools such as spreadsheet applications. The marketers then import that data into the digital advertising platform. This process is referred to as "remarketing" in the advertisement industry.

The use of disparate tools results in a complex process of exporting, reformatting, and importing data. In addition to this complexity, the imported data can become stale, impacting the effectiveness of targeted advertisements. More specifically, because of the complexity of the process, there can be a large time gap (e.g., a day) between the time user interactions are tracked and analyzed and the time the resulting data is imported and the targeted advertisement is provided. As such, a user visiting a product's web site and having a particular interest in a product may not receive an advertisement targeted for that product until much later (e.g., the next day). However, the user's interest may have changed during that long time frame (e.g., the user may have bought a similar product from a different web site). Thus, because of the staleness of the data, a lower than desired conversion rate for the target advertisement results meaning that the frequency of the purchase or other desired user action responsive to the targeted advertisement is less than it might otherwise be if the advertisement had been provided more quickly.

SUMMARY

One exemplary embodiment involves an analytics tool configured to analyze interactions of users with published content and a separate content tool configured to provide targeted content to the users. The exemplary embodiment involves receiving, by the analytics tool, information identifying one or more user interactions of a user using a computing device to interact with the published content. The exemplary embodiment also involves automatically triggering, based on receiving the information identifying the one or more user interactions, the analytics tool to associate the user with a user segment based on analyzing the information identifying the one or more user interactions. The exemplary embodiment also involves automatically triggering, based on associating the user with the user segment, the analytics tool to provide information identifying that the user is associated with the user segment to the content tool. The content tool is configured to provide targeted content to the computing device of the user based on receiving the information identifying that the user is associated with the user segment.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
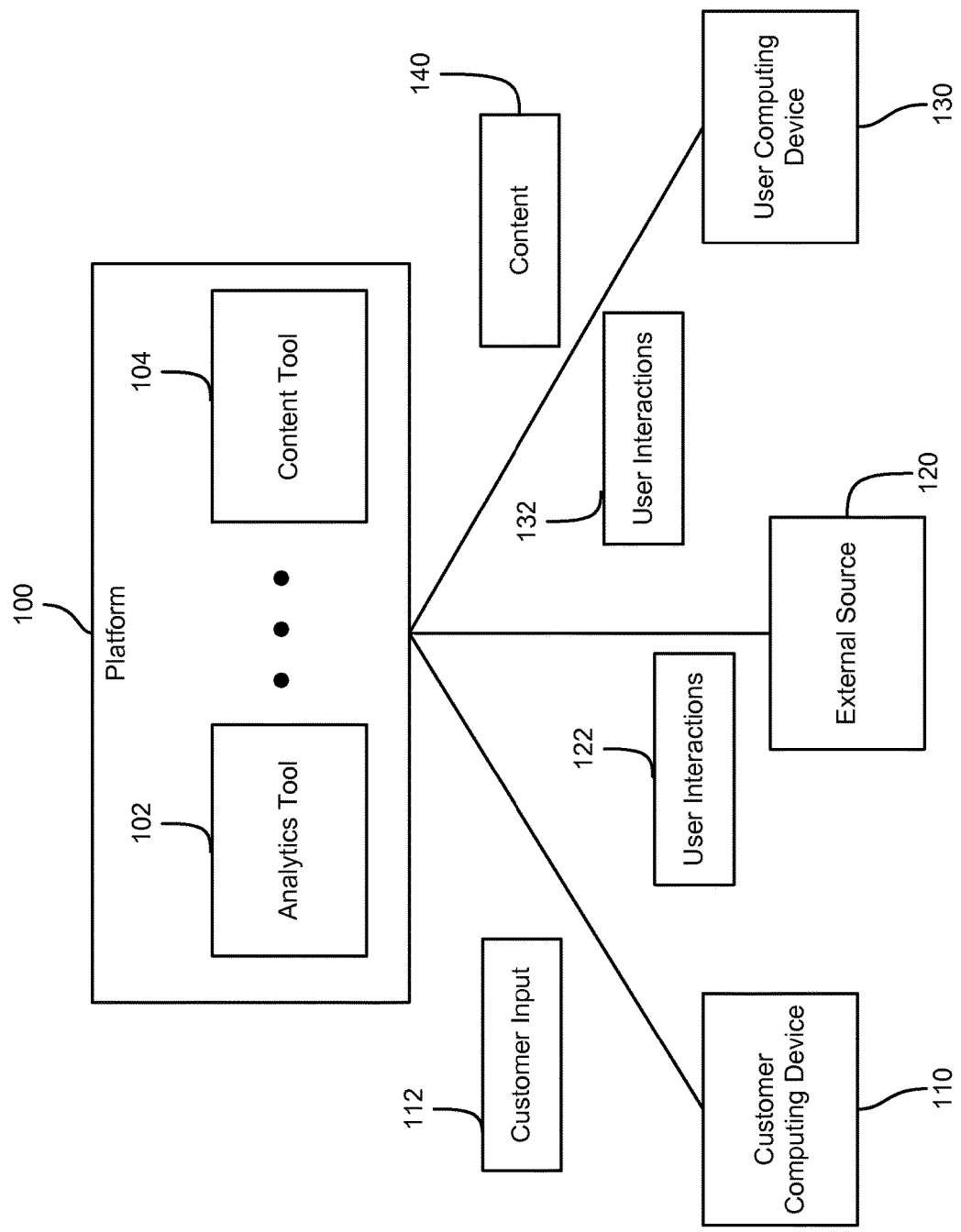
FIG. 1 illustrates an example environment for providing content, according to certain embodiments of the present invention.

Specific details of various exemplary embodiments of the present invention are set forth in the following description and are illustrated in FIGS. 1-9. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Generally, the embodiments described herein are directed to, among other things, providing content, such as advertisements. Specifically, disclosed are methods, systems, and computer readable media that embody techniques for analyzing user interactions to segment users and for providing targeted content accordingly. Unlike the previous techniques that use disparate tools, the embodied techniques provide an integrated solution for providing the targeted content.

In particular, the embodied techniques seamlessly integrate the various tools of the analysts and marketers in a single platform. This platform enables an automated and standardized interface between the tools. By using the platform, the marketers need not import data related to user interactions and segments. Instead, such data is automatically analyzed and stored at the platform and provided to the marketers' tools in a usable format. The process can be further simplified by enabling input of the marketers to predefine actions to be performed automatically based on the data, such as automatically providing targeted content (e.g., targeted advertisements) to users.

This reduction in the complexity of the process also contributes to a higher conversion rate. In particular, the process reduces the time gap between the analysis of the data to generate segments and the consumption of the segments to provide targeted content. Thus, the generated and consumed data is much fresher relatively to that of the previous techniques. In certain embodiments, the data represents real time or substantially real time data.

To illustrate, consider the following example of a product advertisement. A marketer associated with a product's web site defines a segment of "abandoned carts" and associates that segment with a targeted advertisement for a certain discount (e.g., a 20% mark down). In turn, a user visits the product's web site and adds a number of products to a virtual cart. However, the user decides not to check-out the virtual cart and to, instead, immediately visit a news web site. The user interactions (e.g., products added to the virtual cart but not purchased) are analyzed and the user is found to belong to the "abandoned cart" segment. This analysis automatically triggers the discount advertisement to be inserted in a banner space of the news web site as soon as the user accesses this web site. Thus, the targeted advertisement is provided to the user in a short time period. Having just left the product's web site and the products still being fresh on his or her mind, the timely targeted advertisement can entice the user to purchase the products at the discounted price.

As used herein, "platform" refers to a computing environment for hosting a plurality of tools, such as an analytics tool, a content tool, and other computing tools. In an example, the platform is implemented on a computing system. The computing system can be distributed and can provide cloud-based services. Adobe® Marketing Cloud is an example of such computing system.

As used herein, "analytics tool" refers to a computing tool configured to analyze data. In an example, the analytics tool is configured to group users in user segments based on user interactions. A "user segment" refers to a segment of users, such as to groups, audiences, or categories of users. A customer of the platform defines the user segments and associated parameters. Adobe® Analytics is an example of the analytics tool.

As used herein, "content tool" refers to a computing tool configured to provide content. In an example, the content tool is configured to perform an action, such as providing targeted content to a user, based on a user segment to which the user belongs. A customer of the platform defines the action. Adobe® Campaign and Adobe® Media Optimizer are examples of the content tool.

As used herein, "content" refers to data available from a source. In an example, the content is provided from the source to a computing device in various formats such as graphical, auditory, animated, static, two dimensional, three dimensional, or other multi-media formats. An advertisement is an example of content.

As used herein, an "identifier" of an item refers to data that identifies the item. In comparison, a "common identifier" of the item further refers to data that identifies the item commonly between two or more tools. For example, a common identifier of a user segment includes data that identifies the user segment in a same manner across different tools of the platform. An identifier can but need not be a common identifier.

As used herein, "customer" refers to a user of the platform. Typically, a customer signs-up to certain or all of the tools that the platform hosts. A marketer and an analyst are example customers.

As used herein, a "user" refers to an end-user that can but need not use the tools of the platform. An end-user that visits a web site or that downloads an application is an example of the user regardless of whether the web site or the application are associated with the platform or not.

As used herein, "user interactions" refers to interactions of a user (e.g., from a computing device of the user) with a resource, such as a web site or an application. Clicks, swipes, display tilts, adding products to a virtual cart, purchasing the added products, abandoning the virtual cart, and watching, pausing, fast forwarding, skipping, rewinding, or replaying a video clip are examples of user interactions.

As used herein, an "event" represents a particular occurrence based on a set of parameters. For example, a customer defines parameters for adding a user to a user segment based on user interactions. Adding the user to the segment is an example event.

In the interest of clarity of explanation, the various embodiments are described herein within the context of a platform hosting analytics and content tools to provide targeted advertisements based on user segments. However, the embodiments are not limited as such. Instead, the embodiments can similarly apply to other types of tools, to other content types, and/or trigger events. For example, the embodiments can apply to any two or more tools hosted on a platform, where integration between usages of the tools may be desired. In particular, the tools are updated to use common formats such that a triggered event outputted from one tool is consumable by another tool.

Turning to FIG. 1, that figure illustrates an example environment for providing content. In particular, the example environment includes a platform 100 configured to integrate various tools. This integration involves integrating interfaces between the tools and integrating usages of the tools. Accordingly, a customer such as a marketer operates a customer computing device 110 to access the platform 100 and define user segments and actions to be performed based on the user segments. Thereafter, user interactions are tracked and analyzed to associate a user with one or more of the defined user segments. Upon associating the user with a user segment, one or more of the actions applicable to the user segment are automatically performed. For example, a targeted advertisement corresponding to the user segment is provided to a computing device of the user.

In an embodiment, the platform 100 hosts a plurality of tools, such as an analytics tool 102 and a content tool 104. The analytics tool 102 is configured to track and analyze user interactions to associate a user with a user segment. In comparison, the content tool 104 is configured to receive an indication that the user has been associated with the user segment and to, accordingly, provide a targeted advertisement.

The integration of the tools involves various levels. In one level, the integration includes setting-up the platform 100 and/or the tools such that an output of the analytics tool 102 (e.g., the indication that the user has been associated with the user segment) is usable by the content tool 104. For example, an output of the analytics tool 102 automatically triggers an action to be performed by the content tool 104 (e.g., providing the targeted advertisement). In an embodiment, this level of integration updates the tools to use common identifiers of the user segments and to share common identifiers of users. An example of this integration is further illustrated in FIG. 2.

In another level, the integration includes setting-up the platform 100 and/or the tools such that the output of the analytics tool 102 is available for use by the content tool 104 within a short time period (e.g., a few seconds or less) representing real time or substantially real time of data exchange between the tools. For example, this level of integration updates the platform 100 to provide an internal data communication bus between the tools. This bus allows the analytics tool 102 to publish its output and the content tool 104 to receive this output in a quick and efficient manner. An example of this integration is further illustrated in FIG. 3.

In an embodiment, a customer of the platform 100 operates the customer computing device 110 to access the platform 100. Once authenticated, the customer provides customer input 112 that defines the user segments usable by the analytics tool 102 and the actions to be accordingly performed by the content tool 104. The customer input 112 allows updating the analytics tool 102 and the content tool 104 to use common identifiers for the user segments. Once updated, the analytics tool 102 tracks and analyzes user actions based on the customer input 112. This analysis allows the analytics tool 102 to associate a user with a user segment and output the association to the content tool 104 based on the common identifier of the user segment.

The user interactions of a user (or multiple users) are received from one or more sources, external or internal, to the platform 100. The received user interactions are stored in a data store associated with the platform 100 along with an identifier of the user. The data store is accessible to the analytics tool 102 and the content tool 104. The identifier of the user allows the two tools to share a common way for associating the user with the user interactions. As such, if the analytics tool 102 adds the user to a user segment (e.g., by associating the user with the user segment), the content tool 104 can determine that a targeted advertisement is to be provided to the user, and not another user, based on the user identifier being associated with the user interactions.

In an embodiment, an external source 120 represents a remote computing resource from which user interactions 122 are available. For example, the external source 120 is associated with a third party, such as a social media network, that tracks the user interactions 122 using various techniques. The user interactions 122 can be provided to the platform based on a request or an authorization received from the customer and/or a respective user.

In another example, user interactions 132 of a user are received from a user computing device 130 of the user. For example, the user operates the user computing device 130 to visit a web site or run an application. The web site and/or the application can include executable code configured to track the user interactions 132 related to usage of the web site and/or the application and to transmit the user interactions 132 to the platform 100.

Based on the customer input 112 and the user interactions 122 and/or 132, the platform 100 provides content 140 to the user computing device 130. In an example, the content 140 represents a targeted advertisement. The targeted advertisement can be inserted in the same or another web site visited by the user and/or in a user interface of the same or different application running on the user computing device 130.

In an embodiment, the analytics tool 102 analyzes the user interactions 122 and/or 132 and adds the user to a user segment based on the customer input 112 (e.g., the defined user segments). The analytics tool 102 outputs a common identifier of the user segment and an identifier of the user to the content tool 104. In turn, the content tool 104 selects and provides a targeted advertisement to the user computing device 130 based on the customer input 112 (e.g., the defined actions).

Figure 2:
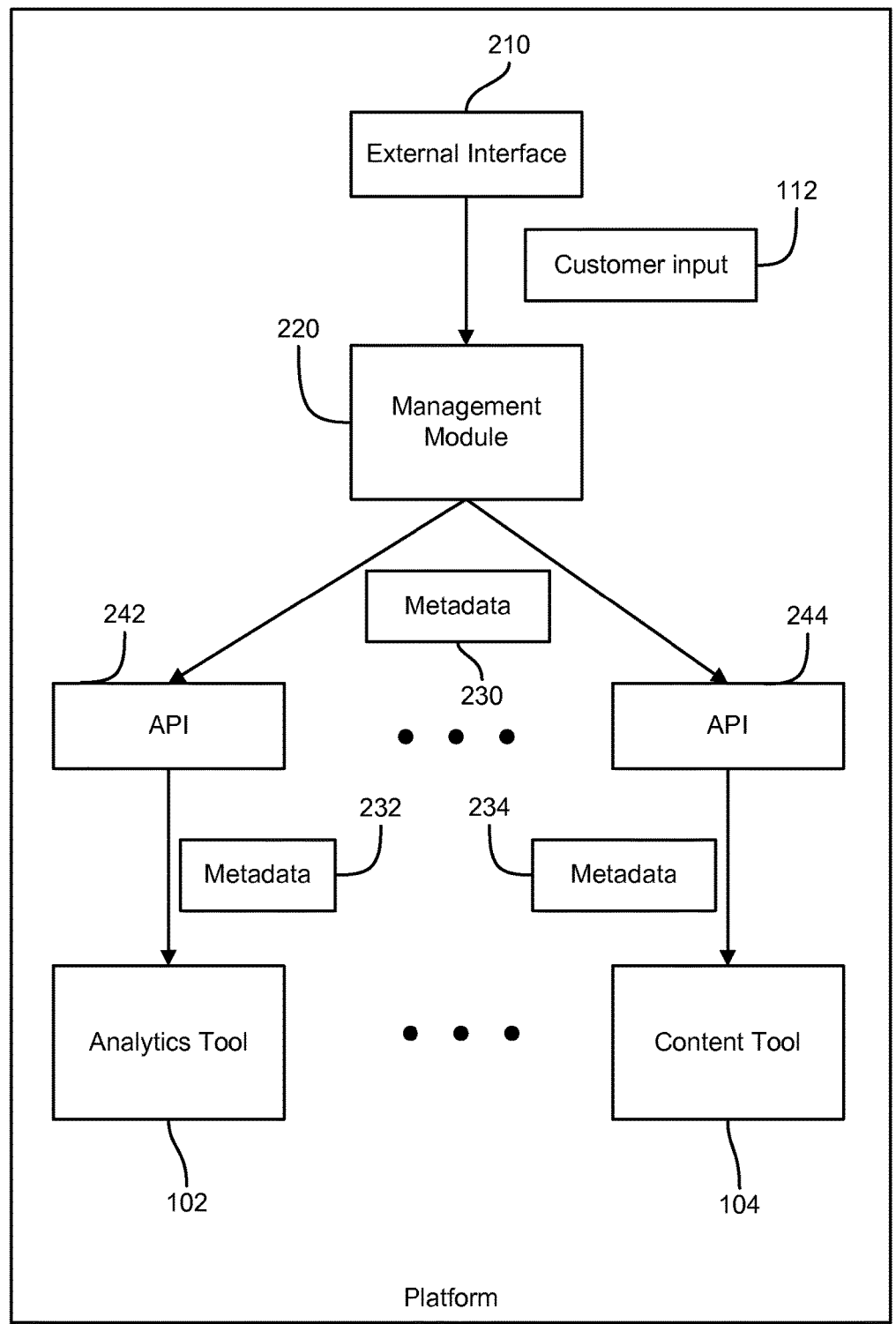
FIG. 2 illustrates an example for setting-up an environment configured to provide content, according to certain embodiments of the present invention.
Figure 3:
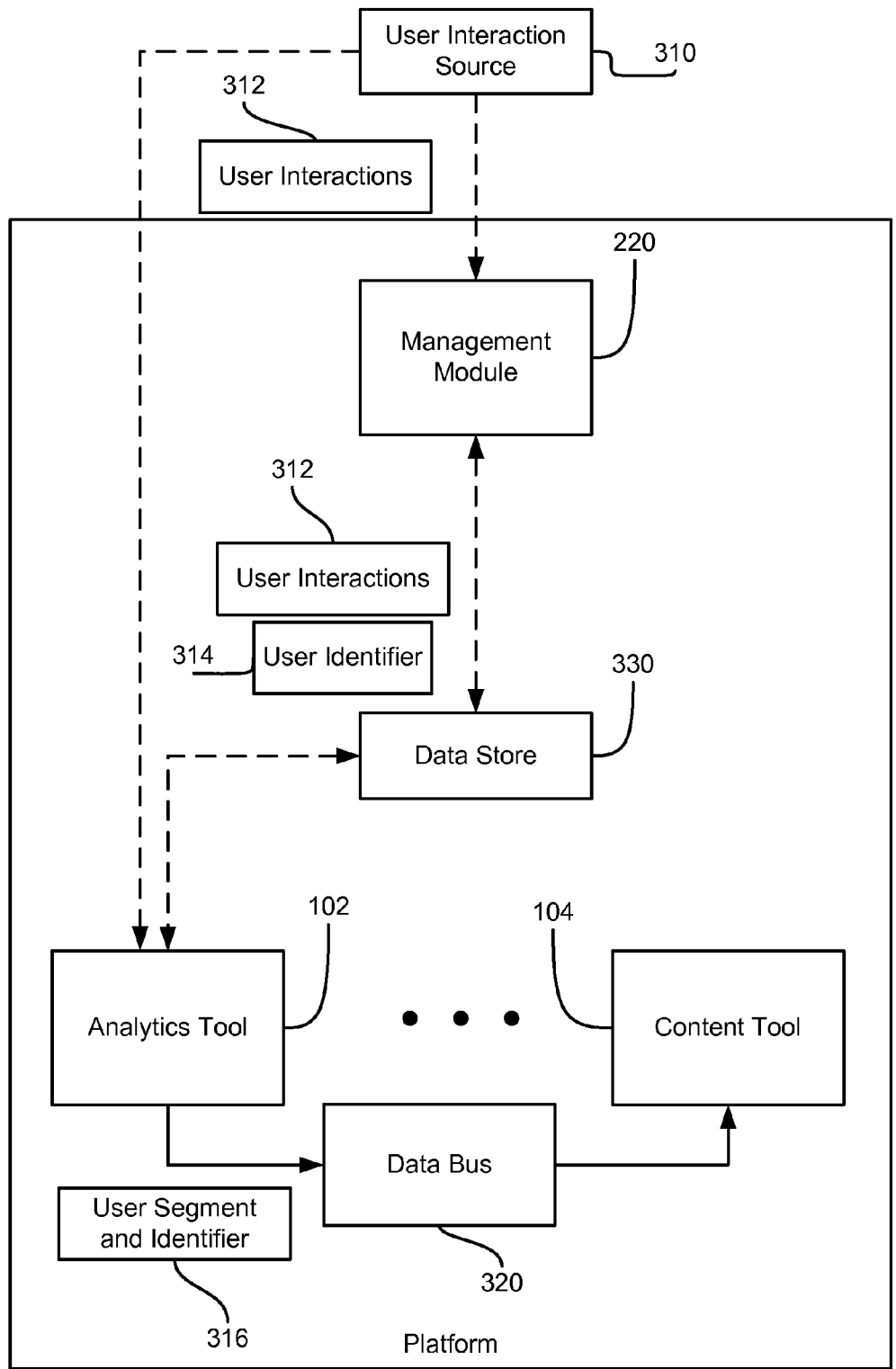
FIG. 3 illustrates an example environment for providing content based on predefined segments and actions, according to certain embodiments of the present invention.

Hence, the platform 100 allows a customer to define user segments and actions. The platform also seamlessly enables the analytics tool 102 and the content tool 104 to use this customer input. The analytics tool 102 analyzes user interactions, whereas the content tool 104 provides targeted content shortly thereafter. As described herein above, this can involve different levels of integrations within the platform 100. FIG. 2 illustrates a level of integration, where the analytics tool 102 and the content tool 104 are updated to implement a common usage of the customer input. In comparison, FIG. 3 illustrates another level of integration, where an output of the analytics tool 102 is available for usage by the content tool 104 within a short time period. In the interest of clarity of explanation, FIGS. 2 and 3 are illustrated in association with a single customer and a single user. However, the embodiments described herein are not limited as such. Instead, the embodiments similarly apply to a plurality of customers and a plurality of users.

Turning to FIG. 2, the figure illustrates an example of updating the analytics tool and the content tool 104 of the platform 100 based on the customer input 112. In an embodiment, the platform 100 provides an external interface 210 accessible to the customer and configured to receive the customer input 112. A web-based interface is an example of the external interface 210.

The platform 100 also hosts a management module 220 configured to receive and process the customer input 112. The management module 220 represents a computing service that processes the customer input 112 and updates the various tools of the platform 100, including the analytics tool 102 and the content tool 104 accordingly. In an example, the management module 220 is a separate tool that interfaces with the other tools of the platform 100. In another example, the management module 220 is integrated in one of the tools or distributed between a set or all of the tools.

The management module 220 generates metadata 230 based on the customer input 112. The customer input 112 includes definitions of the user segments, actions, and parameters associated with the user segments and actions. Parameters of a user segment indicate conditions that need to be satisfied to associate a user with the user segment. Parameters of an action indicate conditions that need to be satisfied (e.g., the user belonging to the user segment) to trigger the action (e.g., a selection of a particular targeted advertisement).

The metadata 230 standardizes these definitions such that the definitions become available in a standard format for use by the various tools of the platform 100. For example, the metadata 230 includes a common identifier for each user segment, a common identifier for each action, and a common identifier for each parameter.

The metadata 230 also specifies how an identifier of a user can be generated. For example, the metadata 230 specifies that the user identifier is to include a unique numeric value that does not contain nor store identifiable information about the user due to privacy concerns. As such, the identifier of the user can include an identifier of a browser or an application of the user computing device 130 or an identifier of the user computing device 130 itself, rather than an identity of the user.

Based on the metadata 230, inputs and outputs of the tools of the platform 100 use a common format such than an output from one tool is usable as an input by another tool. For example, the analytics tool 102 outputs an indication that the user is associated with a user segment based on the user interactions. In this example, the indication includes a common identifier of the user segment and an identifier of the user computing device. Based on this output, the content tool 104 can use this output to determine an appropriate action to perform (e.g., select a particular advertisement) to provide to the user computing device.

In an embodiment, the management module 220 updates the analytics tool 102 and the content tool 104 (and/or other tools of the platform 100) based on the metadata 230. For example, each of the tools is associated with an application programming interface (API). As illustrated, the analytics tool 102 and the content tool 104 are associated with APIs 242 and 244, respectively. The APIs run at various time intervals (e.g., periodically) or when event occurs to access the metadata 230 from the management module 220 and accordingly update the tools. The time intervals can be defined by an administrator of the platform 100 or can be requested by the customer. The event can include receiving the customer input 112 or receiving a number of such inputs exceeding a predefined threshold.

In an example, each tool receives the same metadata 230. In another example, each tool receives relevant portions of the metadata 230. As illustrated, the analytics tool 102 is updated based on metadata 232, whereas the content tool 104 is updated based on the metadata 234. The metadata 232 represents a portion of the metadata 230 containing data relevant to the operations of the analytics tool 102. For example, the metadata 232 includes common identifiers of user segments but not common identifiers of actions. In comparison, the metadata 234 represents another portion of the metadata 230 containing data relevant to the operations of the content tool 104. For example, the metadata 234 includes common identifiers of actions and common identifiers of user segments.

Hence, by updating the various tools of the platform 100 to use common formats for the customer input 112, efficient exchange and reuse of data across the tools can be achieved. An output from one tool is usable as input to another tool and so on and so forth, regardless of how complex, intricate, or simple the customer input 112 is. In addition, regardless of how the customer input varies from one customer to the next, the tools of the platform 100 properly ingest the diverse customer inputs to provide the customer-desired operations.

Turning to FIG. 3, the figure illustrates another level of integration implemented within the platform 100. In an embodiment, a data bus 320 is configured as an internal communication path between the tools. Thus, an output from one tool (e.g., the analytics tool 102) is received by another tool (e.g., the content tool 104). When a common format is used, as described in connection with FIG. 2, the output is usable as an input to the other tool, thereby triggering an operation to be automatically performed by the other tool.

As illustrated, user interactions 312 associated with a user are received from a user interaction source 310, such as the external source 120 or the user computing device 130. As indicated with the dashed lines, the user interactions 312 can be received by one or more tools of the platform 100, such as the analytics tool 102 and/or the management module 220. In turn, the receiving tool, or another tool of the platform 100, is configured to associate the user interactions with a user identifier 314 of the user. The user identifier 314 is generated by the receiving tool or the other tool (e.g., an identifier tool implemented within the platform 100 and configured to generate user identifiers). As described herein above, the user identifier 314 includes a unique numeric value that does not contain nor store identifiable information about the user due to privacy concerns. For example, the user interactions 314 can include identifiers of the user computing device 130 or a browser or an application running on the user computing device 130. This information is usable to generate the user identifier 314. In an example, the user identifier 314 is generated as a cookie. The same cookie is shared and used by the various tools to associate the user interactions 312 with the user.

Once generated, the user identifier 314 and the user interactions 312 are stored in a data store 330 of the platform 100. As stored, the user interactions 312 are associated with the user identifier 314. For example, the data store 330 stores the user identifier 314 and the user interactions 312 in a key-value pair. Some or all of the tools of the platform 100 have access to the data store 330. This enables the tools to process the user interactions 312 for various purposes while also, and as needed, being capable of associating the user interactions 312 with the user.

In an embodiment, the analytics tool 102 processes the user interactions 312. This processing includes determining that the user belongs to one or more user segments according to the parameters defined by the customer input 112. If a user belongs to a user segment, the analytics tool 102 outputs an indication 316 of this user-to-user segment association. In an example, the indication 316 includes a common identifier of the user segment and the user identifier 314.

The analytics tool 102 provides the indication 316 on the data bus 320 to be received by one or more of the other tools of the platform 100. In an example, providing the indication 316 includes publishing this indication on the data bus 320. Various types of publishing techniques are usable. Some of the techniques can but need not involve the management module 220 directing the communication over the data bus 320. Further, some of the techniques depend on the type of the data bus 320. Generally, the data bus 320 represents an internal communication bus of the platform configured to facilitate a secure exchange of data (e.g., messages such as the indication 316) between the tools. Publishing the indication 316 over the data bus 320 includes one or more of broadcasting, multicasting, or unicasting the indication 316 from the analytics tool 102 to one or more of the remaining tools (e.g., the content tool 104).

Once outputted on the data bus 320, the content tool 104 receives the indication 316. Based on the customer input 112 defining parameters and actions, the content tool 104 automatically performs one or more of the actions. For example, the content tool 104 determines content based on the identified segment and determines a destination of the content, such as the user computing device 130, based on the identified user. The customer input 112 can define what content to provide, such as a selection or a generation of a particular advertisement.

Hence, by using the data bus 320, data between the tools of the platform 100 is exchanged quickly and efficiently. Once a user interest is detected based on the user interactions, the user is added to a user segment that best matches the user interest. In turn, targeted content is provided to the user based on the user segment. This process is automated and can be executed in a short period of time (e.g., within seconds). Thus, the data used by the various tools is relatively fresh. The freshness results in, for example, a higher conversion rate for targeted advertisements and an overall improvement to services customized to the user.

Figure 4:
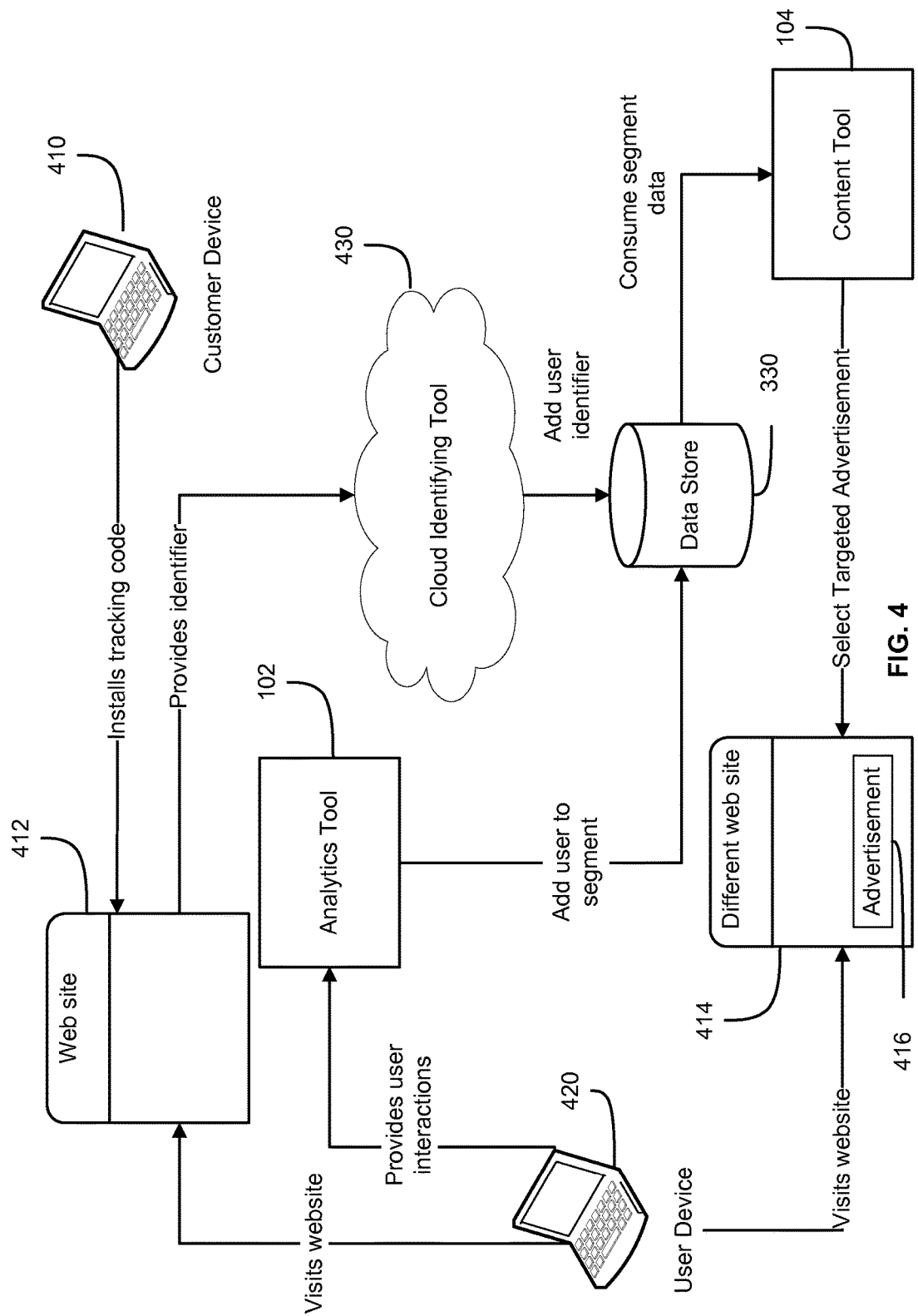
FIG. 4 illustrates an end-to-end example environment for providing content, according to certain embodiments of the present invention.

Turning to FIG. 4, the figure illustrates an example of using the platform 100 to provide targeted content. The example is illustrated within the context of tracking user interactions at one web site and accordingly inserting a targeted advertisement in another web site. However, the embodied techniques are not limited as such. Instead, the embodied techniques similarly apply to other examples. These examples include providing the targeted advertisement within the same web site. These examples also include providing other types of targeted content to other computing resources such as an application running on a mobile device or tablet.

As illustrated, a customer operates a customer device 410, similar to the customer computing device 110, to access the platform 100 and to provide customer input. The customer input updates the analytics tool 102 and the content 104 to associate users with segments and provide targeted advertisements, respectively. One of the customer-defined user segments includes an "abandoned cart" segment. A corresponding targeted advertisement offers a particular discount.

The customer device 110 also accesses (e.g., downloads from the platform 100 or receives in response to the customer input) executable code, such as a JavaScript or a beacon. Upon execution, the executable code is configured to track user interactions. What user interactions to track can be defined based on the customer input or can be set to certain default settings. The customer further operates the customer device 410 to install (e.g., embed) the executable code in a web site 412 associated with the customer. In this example, the web site represents a product's web site offering multiple products for sale.

A user operates a user device 420, similar to the user computing device 130, to visit the web site 412 and browse different products. When a browser of the user device 420 loads the web site 412 (or a web page thereof), the embedded code is executed enabling the tracking of the user interactions with the web site. As such, the user interactions are provided from the user device 420 to the platform 100 (e.g., to the analytics tool 102). For example, the user adds a number of products to a virtual cart, but subsequently abandons the virtual cart without purchasing the added products. The corresponding user interactions are provided to the platform 100.

In addition, an identifier of the user device 420 or the browser is provided to a cloud identifying tool 430 of the platform 100 in response to the visiting the web site 412. The cloud identifying tool 430 is configured to generate a user identifier (e.g., a cookie) based on the received identifier and to add the user identifier to the data store 330. The user identifier is associated with all the user interactions that are taken by the browser or the user device 420 and that are tracked by the analytics tool 102. These user interactions can also be stored in the data store 330 in association with the user identifier, enabling various tools of the platform 100 to use such data as input to their respective capabilities or operations.

The analytics tool 102 analyzes the user interactions based on parameters specified in the customer input. If the user is found to belong to one of the segments, the analytics tool 102 adds (e.g., associates) the user to the user segment and publishes an indication of this addition on the internal communication bus of the platform 100. The indication includes a common identifier of the user segment. For example, the analytics tool 102 publishes a tag that identifies the "abandoned cart" segment. This tag is commonly used by the other tools of the platform 100 to refer to the "abandoned cart" segment. In addition, the indication is added to the data store 330.

In turn, other tools such as the content tool 104 consumes the segment data. For example, the content tool 104 receives the indication, triggering an automatic selection of a targeted advertisement as specified in the customer input, such as the advertisement for the discount. In addition, the content tool 104 accesses the associated user identifier from the indication (or from the data store 330) to determine a destination for the targeted advertisement.

The user may have abandoned the virtual cart to visit another web site 414, such as a news web site with a banner space for advertisement. As soon as the user visits the other web site 414, the content tool 104 can receive an offer to insert an advertisement in the banner space, along with an identifier of the user. As such, the content tool 104 bids on that space and, as applicable, inserts the targeted advertisement that was determined based on the user interactions. Thus, the content tool 104 is capable, within a short time period after the virtual cart is abandoned, of inserting a relevant advertisement (e.g., a discount applicable the abandoned products) for presentation to the user.

Turning to FIGS. 5-8, those figures illustrate example flows for providing content. In the illustrative operations, each of the operations or functions can be embodied in, and fully or partially automated by, tools and/or modules executed by one or more processors of a computing system implementing the platform 100. An example computing system is further illustrated in FIG. 9. Additionally, while the operations are illustrated in a particular order, it should be understood that no particular order is necessary and that one or more operations can be omitted, skipped, and/or reordered. In the interest of clarity of explanation, an example of providing targeted content (e.g., advertisement) based on an analysis of user interactions is illustrated. Nevertheless, one of ordinary skill in the art would appreciate that the flows similarly apply to other examples and tools. In also the interest of clarity of explanation, the illustrated example describes customer input of a customer, a user segment, an action, and user interactions of a user. Nevertheless, one of ordinary skill in the art would appreciate that the flows similarly apply to a plurality of customers, user segments, actions, and users.

Figure 5:
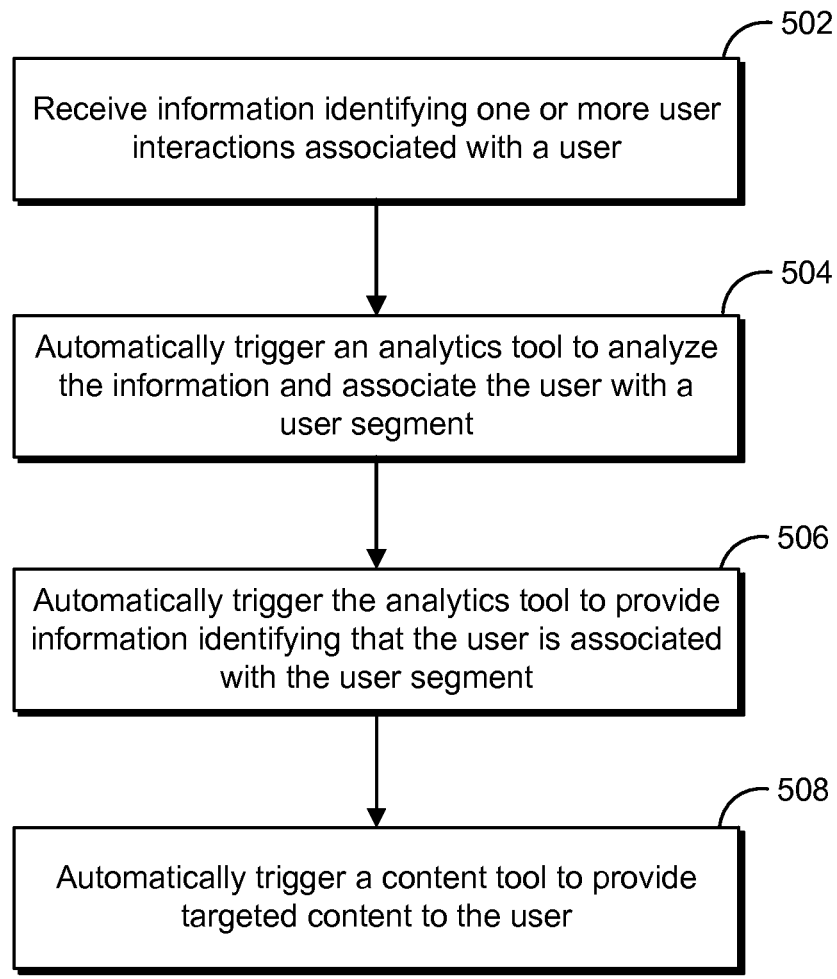
FIG. 5 illustrates an example flow for providing content, according to certain embodiments of the present invention.
Figure 6:
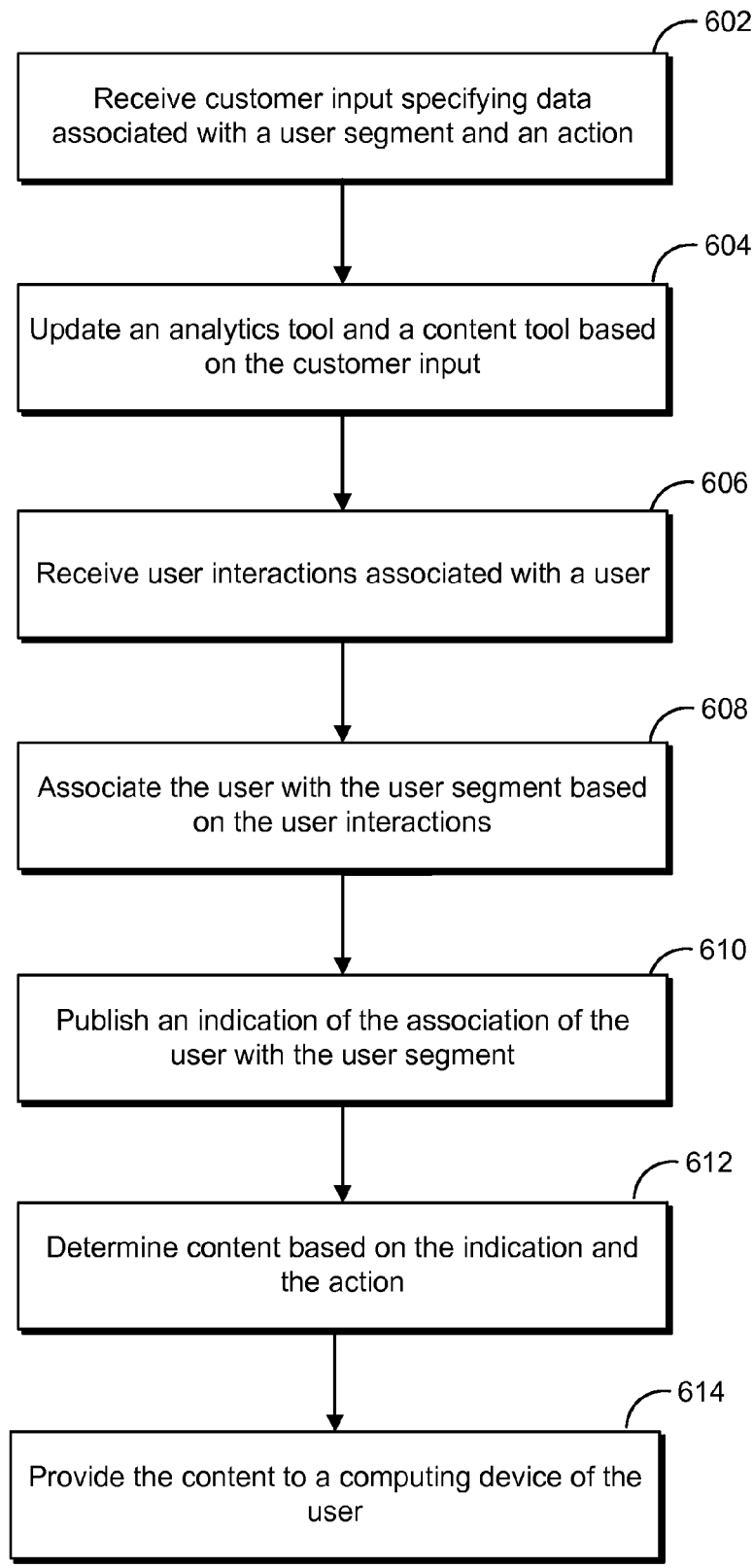
FIG. 6 illustrates another example flow for providing content, according to certain embodiments of the present invention.
Figure 7:
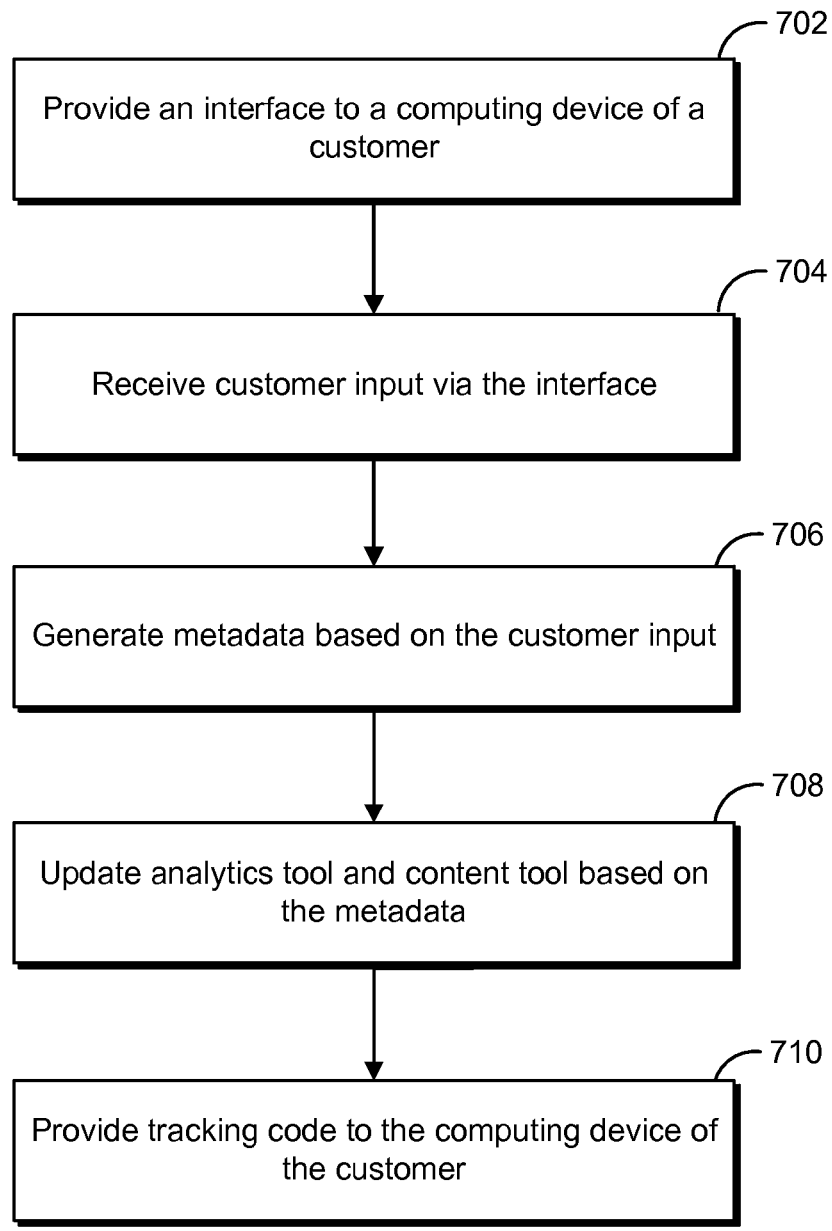
FIG. 7 illustrates an example for flow for setting-up an environment to provide content, according to certain embodiments of the present invention.
Figure 8:
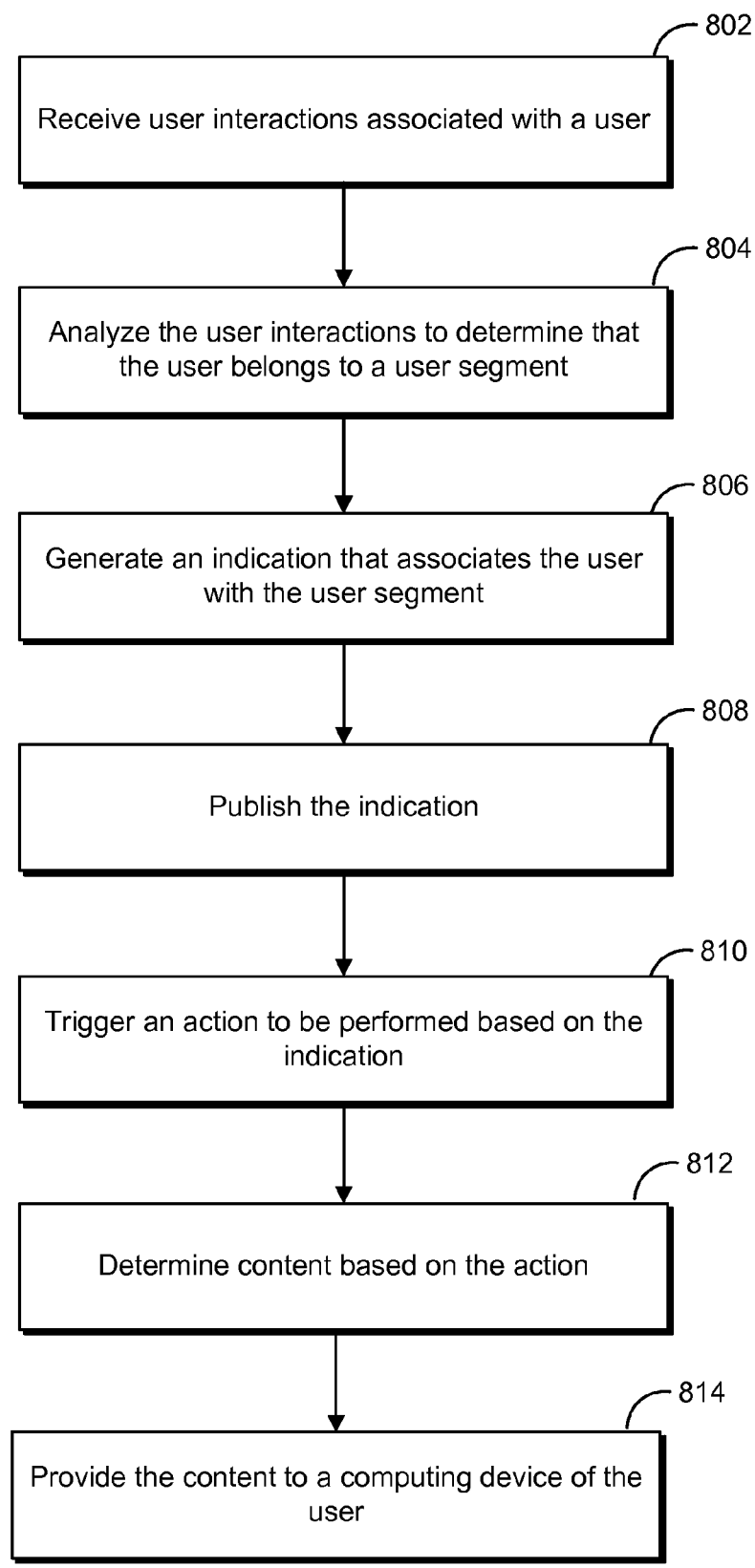
FIG. 8 illustrates an example flow for providing content based on predefined segments and actions, according to certain embodiments of the present invention.

FIG. 5 illustrates an example overall flow for providing the targeted content. In comparison, FIG. 6 illustrates another example overall flow for providing the targeted content, including various levels of integrations. FIG. 7 illustrates an example flow for processing customer input to update the analytics and content tools. FIG. 8 illustrates an example flow for providing the targeted content based on analyzing the user interactions according to the customer input. Operations of the example flow of FIG. 5 are further embodied in operations of example flows of FIGS. 7-8. As such, some operations of the example flows of FIGS. 5-8 are similar. Such similarities are not repeated herein in the interest of clarity of explanation.

Turning to FIG. 5, the example flow starts at operation 502, where information identifying one or more user interactions associated with a user is received. The information is received at a platform that hosts a plurality of tools including an analytics tool and a content tool. In an example, the information is received by the analytics tool from a computing device of the user. In another example, the information or a portion thereof, is received from another source external to the platform, such as from a social media network. The user interactions correspond to the user using the computing device to interact with published content, such as one available from a web site or an application. At operation 504, the analytics tool is automatically triggered to analyze the information and associate the user with a user segment. In an example, the user segment is defined based on input of a customer of the platform. For instance, an interface is provided to the computing device of the customer. The interface is configured to receive the customer input defining the user segment and parameters to associate the user with the user segment based on an analysis of the user interactions (or the information thereof). In a further example, the automatic trigger includes providing a common identifier of the user segment and a common identifier of the user or the computing device of the user such that the analysis is associated with these identifiers. In this way, the analytics tool and the content tool, along with other tools of the platform are configured to use these identifiers such that an output of one tool is usable as input to, or more generally, by the other tools.

At operation 506, the analytics tool is automatically triggers to provide information identifying that the user is associated with the user segment. This information is triggered based on the analysis of the operation 504. In addition, this information includes one or more of the common identifier of the user segment and the common identifier of the user or user computing device. In this way, the output of the analytics tool (e.g., this information) is usable by the other tools of the platform.

At operation 508, the content tool is automatically triggered to provide targeted content to the user. In an example, this trigger is based on receiving the information identifying that the user is associated with the user segment from the analytics tool. Providing the targeted content is an example of an action that the content automatically performs in response to receiving this information. This and other actions can be defined based on the customer input provided at the interface.

Turning to FIG. 6, the example flow starts at operation 602, where customer input specifying data associated with a user segment and an action is received. For example, a customer operates a customer device to access the platform 100, log in to a respective customer account, and provide the customer input.

At operation 604, the analytics tool 102 and the content tool 104 are updated based on the customer input. For example, a common identifier of the user segment is provided to both tools. This allows the analytics tools 102 and the content tool 104 to exchange data about the user segment. For example, an output of the analytics tool 102 includes the common identifier and is usable, based on the common identifier, as an input to the content tool 104. In addition, both tools can be updated to share a same identifier of a user. As such, if the analytics tool 102 outputs data related to the user segment or to user interactions, the analytics tools 102 can also associate that data with the user identifier. In turn, the content tool 104 is capable of processing the data in association with the user identifier.

At operation 606, user interactions associated with a user are received. The user interactions correspond to actions of the user performed using a user computing device. The actions include interactions with a computing resource such as a web site or an application. The received interactions are associated with an identifier of the user. This user identifier is shared across the tools of the platform 100.

At operation 608, the user is associated with the user segment based on the user interactions. For example, the analytics tool 102 accesses or receives the user interactions. Thereafter, the analytics tool 102 analyzes the user interactions according to the customer input. For example, parameters from the customer input are applied to the user interactions to determine whether the user belongs to the user segment or not. This determination uses, in some examples, one or more analysis techniques, such as matching, pattern recognition, or regression models, to match the user interactions with a customer-defined user segment and accordingly associate the user with the matched user segment. If the user is associated with the user segment, the analytics tool 102 generates an indication of this association. In an example, the indication includes the common identifier of the user segment and the user identifier.

At operation 610, the indication of the association of the user with the user segment is published. For example, the analytics tool 102 outputs the common identifier and the user identifier on the data bus 320 of the platform 100. The publication allows other tools, such as the content tool 104, to receive the indication and to automatically perform predefined actions as applicable.

At operation 612, content is determined based on the indication of the customer-defined action. For example, the content tool 104 receives the indication over the data bus 320. The content tool 104 also determines the user segment from the indication based on the common identifier. In response, the content tool 104 determines the action to perform as specified in the customer input. The action includes determining (e.g., selecting or generating) a targeted advertisement. Further, the content tool 104 determines a target for the advertisement based on the user identifier.

At operation 614, the content is provided to the computing device of the user. For example, in response to the user computing device accessing a computing resource, such as a web site, the content tool 104 inserts the targeted advertisement in a section or space of the computing resource for presentation to the user at the user computing device.

Hence, by updating the tools of the platform 100 based on the customer input and using an internal data bus, the operations of the tools can be seamlessly integrated. In turn, computing services provided to the user are improved by, for example, providing the user with relevant and fresh data based on the user interactions. Turning to FIG. 7, the figure illustrates a flow for using the customer input to update the tools of the platform 100.

The example flow of FIG. 7 starts at operation 702, where an interface is provided to a computing device of a customer. In an example, the platform 100 provides a web-based interface to the computing device to enable the customer to log into the platform 100 and input the customer input.

At operation 704, customer input is received via the interface. The customer input specifies, for example, a user segment and an action to be performed based on the user segment. The customer input can also define one or more parameters and/or one or more execution rules to trigger events. An example event includes associating a user with the user segment. If no parameters or rules are specified, the platform 100 applies default parameters and/or rules.

At operation 706, metadata based on the customer input is generated. For example, the management module 220 of the platform 100 processes the customer input to generate the metadata. The metadata includes common identifiers of the user segment, action, parameters, and rules. The common identifiers allow one or more tools of the platform 100 to use data outputted by one or more other tools of the platform 100. In an example, one set of metadata is generated and provided to the various tools of the platform 100. In another example, various sets of metadata are generated based on capabilities of the tools such that each tool receives a respective set.

At operation 708, the tools of the platform 100, such as the analytics tool 102 and the content tool 104, are updated based on the metadata. For example, the management module uses API calls to provide the metadata and update the analytics tool 102 and the content tool 104. In an example, the APIs calls are performed at predefined time intervals (e.g. periodically). In another example, the API calls are performed after a number of customer inputs are received or sets of metadata are generated. Based on the update, the tools can exchange data using common formats such that an output from one tool is usable as input to another tool.

At operation 710, tracking code is provided to the computing device of the customer. The tracking code, such as a JavaScript or a beacon, is configured to track user interactions. In an example, the tracking code is generated at the platform 100 based on the customer input. In this example, the customer input specifies what user interactions to track. In another example, the tracking code is independent of the customer input and is configured to track predefined or default user interactions. The tracking code can be pushed to or pulled by the customer computing device. Thereafter, the customer computing device installs the tracking code in a computing resource associated with the customer, such as a web site or an application.

Once the tools of the platform 100 are updated and the tracking code is installed, user interactions with the accessed computing resource can be analyzed. In addition, user interactions received from another external source, such as from a third party, can be similarly analyzed. In an example, the analysis is performed by the analytics tool. The result of the analysis automatically, and within a short time period, triggers an action by the content tool. The triggered action is based on the provided customer input. An example flow for analyzing the user interactions and performing an action is further illustrated in FIG. 8.

The example flow of FIG. 8 starts at operation 802, where user interactions associated with a user are received. In an example, the user interactions are received from a computing device of the user in response to accessing the computing resource associated with the customer and executing the tracking code. In another example, the user interactions are received from another external source, such as from a social media platform. The analytics tool 102, the management module 220, and/or another tool of the platform 100 receives the user interactions. Further, the receiving tool, or another tool such as the cloud identifying tool 430, associates the user interactions with an identifier of the user. The user identifier, such as a cookie, is shared by the tools of the platform 100. This enables each tool to associate the user interactions with the user in a common way.

At operation 804, the user interactions are analyzed to determine that the user belongs to a user segment. For example, the analytics tool 102 analyzes the user interactions and determines that the user belongs to one or more of the user segments specified by the customer input.

At operation 806, an indication that associates the user with the user segment is generated. For example, the analytics tool 102 generates the indication based on the analysis. The indication includes the common identifier (e.g., a tag) of the user segment. In an example, the indication also includes the user identifier.

At operation 808, the indication is published. For example, the analytics tool outputs the indication on the data bus 320 of the platform 100. The publication allows other tools of the platform 100, such as the content tool 104, to receive the indication in a short time period. Because of the common identifier of the user segment and the shared user identifier, the indication is usable as input to the other tools.

At operation 810, an action to be performed is triggered based on the indication. For example, the content tool 104 receives the indication and determines the user segment and the user identifier. The content tool 104 applies one or more actions specified by the customer input as applicable to the user segment and/or the user identifier. An example of an action includes providing content associated with the user segment, where the content is destined the user.

At operation 812, content is determined based on the action. For example, the content tool 104 selects a targeted advertisement from a list of available advertisements. In another example, the content tool generates a targeted advertisement by assembling various content portions from a list of available content portions.

At operation 814, the determined content is provided to the computing device of the user. For example, the content tool 104 determines that the advertisement is to be destined to the user based on the user identifier. Further, the content tool 104 receives data indicating that the user (or the user computing device) is accessing a computing resource that allows insertion of the targeted advertisement, such as a web site with advertisement space. Accordingly, the content tool 104 initiates a process to insert the targeted advertisement at the computing resource for presentation to the user.

Hence, once the tools of the platform 100 are updated based on the customer input and the user interactions are received, the tools can automatically analyze the user interactions and provide targeted content. In other words, the process of providing targeted content, and more generally, customizing a computing service to the user, is simplified and needs no intervention of the customer once the customer input has been provided. Further, the execution of the process is accelerated such that the targeted content is provided to the user within a short time period (e.g., within seconds) after receipt of the user interactions.

Figure 9:
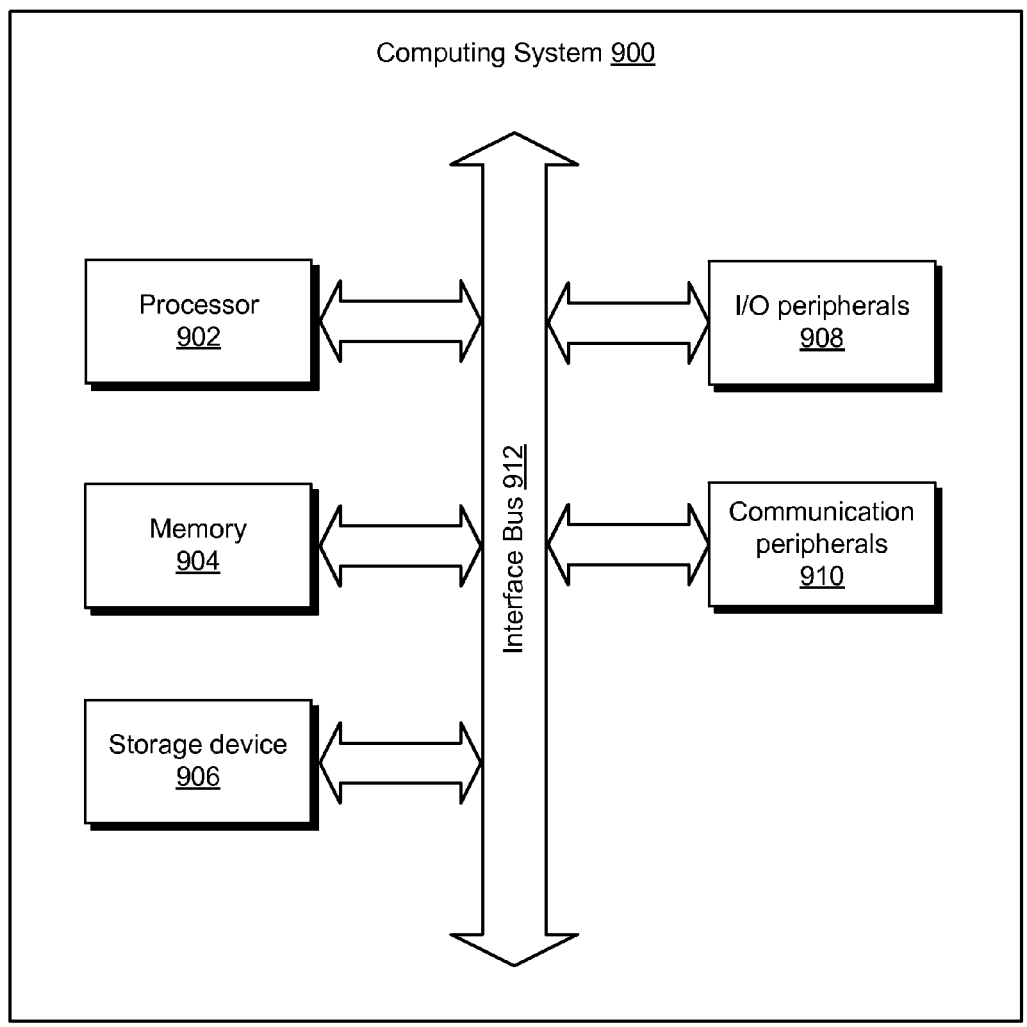
FIG. 9 illustrates an example computing system architecture for providing content, according to certain embodiments of the present invention.

Turning to FIG. 9, the figure illustrates an example computing system 900 for implementing some or all of the components of the platform 100. Although a single computing system is illustrated, this system can be distributed to provide, for example, cloud computing services.

The computing system 900 includes at least a processor 902, a memory 904, a storage device 906, input/output peripherals 908, communication peripherals 910, and an interface bus 912. The interface bus 912 is configured to communicate, transmit, and transfer data, controls, and commands among the various components of the computing system 900. The memory 904 and the storage device 906 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure, such as the various tools, the data bus, the modules, and/or the APIs of the platform 100. The memory 904 and the storage device 906 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computing system of, for example, a cloud network or a datacenter. The input and output peripherals 908 includes user interfaces such as a keyboard, screen, microphone, speaker, other input/output devices, and computing components such as graphical processing units, serial ports, parallel ports, universal serial bus, and other input/output peripherals. The input/output peripherals 908 are connected to the processor 902 through any of the ports coupled to the interface bus 912. The communication peripherals 910 are configured to facilitate communication between the computing system 900 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. In a computing platform having an analytics tool configured to analyze interactions of users with published content and a separate content tool configured to provide targeted content to the users, a computer-implemented method comprising:
   receiving, by the computing platform from a marketer computing device, input that identifies a user segment and a parameter for an action associated with the user segment;
   generating, by the computing platform based on the input, metadata that comprises (i) an identifier of the user segment, (ii) an identifier of the action, and (iii) an identifier of the parameter, wherein the metadata standardizes an interface between the analytics tool and the content tool by specifying how an identifier of a user associated with the user segment should be generated according to a standard format common to the analytics tool and the content tool, wherein the metadata is provided to the analytics tool and the content tool based on respective application programming interfaces of the analytics tool and the content tool;
   providing, by the computing platform, at least portions of the metadata to the analytics tool and the content tool;
   receiving, by the analytics tool, first information identifying one or more user interactions of the user using a computing device to interact with the published content;
   automatically triggering, based on receiving the first information identifying the one or more user interactions, the analytics tool to associate the user with the user segment based on analyzing the first information identifying the one or more user interactions, wherein the associating of the user with the user segment comprises associating the identifier of the user with the identifier of the user segment based on the metadata; and
   automatically triggering, based on the associating of the user with the user segment, the analytics tool to provide second information identifying that the user is associated with the user segment to the content tool, the second information comprising the identifier of the user and the identifier of the user segment in the standard format,
   wherein the second information is published from the analytics tool to the content tool over an internal communication bus,
   wherein the respective application programming interfaces are separate from the internal communication bus, and
   wherein the content tool is configured to provide targeted content to the computing device of the user based on the second information identifying that the user is associated with the user segment and based on the identifier of the action and on the identifier of the parameter from the metadata.

2. The computer-implemented method of claim 1, further comprising updating the analytics tool and the content tool to use a common identifier of the user segment in the standard format common to the analytics tool and the content tool, wherein the second information identifying that the user is associated with the user segment comprises the common identifier.

3. The computer-implemented method of claim 1, wherein the analytics tool and the content tool are configured to use a common identifier of the user segment and a common identifier of the user in the standard format common to the analytics tool and the content tool, and wherein the second information identifying that the user is associated with the user segment comprises the common identifier of the user segment and the common identifier of the user.

4. The computer-implemented method of claim 1, wherein the published content is available from a web site that embeds a beacon for tracking the user interactions, wherein the targeted content comprises an advertisement to be inserted in another web site accessed by the computing device of the user.

5. The computer-implemented method of claim 1, wherein the platform comprises a cloud-based service for hosting a plurality of tools comprising the analytics tool and the content tool.

6. The computer-implemented method of claim 1, wherein the platform comprises the internal communication bus configured to interconnect the analytics tool and the content tool, and wherein the second information identifying that the user is associated with the user is published from the analytics tool to the content tool over the internal communication bus.

7. The computer-implemented method of claim 1, wherein the metadata comprises a common identifier of user segment, parameters for associating the user with the user segments based on the user interactions, and a definition of an action to be performed to determine the targeted content.

8. The computer-implemented method of claim 1, wherein the analytics tool and the content tool are configured to use a cookie uniquely assigned to the computing device of the user, and wherein the second information identifying that the user is associated with the user segment comprises the cookie.

9. A non-transitory computer-readable medium comprising instructions that, when executed on a computing system associated with a platform hosting an analytics tool and a content tool to a customer, cause the computing system to at least:
   receive input of the customer defining a user segment for the analytics tool and defining an action for the content tool to perform based on the user segment;
   generate, based on the input, metadata that comprises (i) an identifier of the user segment and (ii) an identifier of the action, wherein the metadata standardizes an interface between the analytics tool and the content tool by specifying how an identifier of a user associated with the user segment should be generated according to a standard format common to the analytics tool and the content tool, wherein the metadata is provided to the analytics tool and the content tool based on respective application programming interfaces of the analytics tool and the content tool;

provide at least portions of the metadata to the analytics tool and the content tool;

receive first information identifying user interactions of the user using a computing device to interact with published content;

cause the analytics tool to analyze the first information identifying the user interactions based on the input of the customer defining the user segment and to associate the user with the user segment based on the analyzing, wherein the associating of the user with the user segment comprises associating the identifier of the user with the identifier of the user segment based on the metadata; and cause, based on associating the user with the user segment, the analytics tool to provide second information identifying that the user is associated with the user segment to the content tool, the second information comprises the identifier of the user and the identifier of the user segment in the standard format, wherein the second information is published from the analytics tool to the content tool over an internal communication bus, wherein the respective application programming interfaces are separate from the internal communication bus, and wherein the content tool is configured to automatically perform the action based on receiving the second information identifying that the user is associated with the user segment and based on the identifier of the action from the metadata.

10. The non-transitory computer-readable medium of claim 9, wherein the instructions, when executed on the computing system, further configure the computing system to provide an interface configured to receive the input of the customer from a computing device of the customer.

11. The non-transitory computer-readable medium of claim 9, wherein the user segment indicates an interest common to a plurality of users, and wherein performing the action comprises selecting and providing an advertisement based on the interest to the computing device of the user.

12. The non-transitory computer-readable medium of claim 9, wherein the analytics tool and the content tool comprise the respective application programming interfaces configured to receive the metadata.

13. The non-transitory computer-readable medium of claim 12, wherein the platform comprises the internal communication bus configured to interconnect the analytics tool and the content tool, and wherein the second information identifying that the user is associated with the user segment is exchanged between the analytics tool and the content tool over the internal communication bus.

14. The non-transitory computer-readable medium of claim 13, wherein the instructions, when executed on the computing system, further configure the computing system to:

associate the user interactions with an identifier of the computing device of the user; and store the user interactions and the identifier of the computing device in a data store of the platform, wherein the analytics tool and the content tool have access to the data store.

15. A system associated with a platform hosting an analytics tool and a content tool, the system comprising:

one or more processors;

one or more non-transitory computer-readable media communicatively coupled to the one or more processors and bearing instructions that, upon execution by the one or more processors, cause the system to at least:

provide an interface to a computing device of a customer, wherein the interface is configured to facilitate customer input specifying a user segment for the analytics tool and indicating content for the content tool based on the user segment;

generate, based on the customer input, metadata that comprises (i) an identifier of the user segment and (ii) an identifier of the content, wherein the metadata standardizes an interface between the analytics tool and the content tool by specifying how an identifier of a user associated with the user segment should be generated according to a standard format common to the analytics tool and the content tool, wherein the metadata is provided to the analytics tool and the content tool based on respective application programming interfaces of the analytics tool and the content tool;

provide at least portions of the metadata to the analytics tool and the content tool;

receive first information identifying user interactions of the user using a computing device to interact with published content;

trigger the analytics tool to analyze the first information identifying user interactions based on the input of the customer specifying the user segment and to associate the user with the user segment based on the analyzing, wherein the associating of the user with the user segment comprises associating the identifier of the user with the identifier of the user segment based on the metadata; and trigger, based on associating the user with the user segment, the analytics tool to provide second information identifying that the user is associated with the user segment to the content tool, the second information comprising the identifier of the user and the identifier of the user segment in the standard format, wherein the second information is published from the analytics tool to the content tool over an internal communication bus, wherein the respective application programming interfaces are separate from the internal communication bus, and wherein the content tool is configured to automatically provide the content to the computing device of the user based on receiving the second information identifying that the user is associated with the user segment and based on the identifier of the content from the metadata.

16. The system of claim 15, wherein the instructions that, upon execution by the one or more processors, cause the system to provide code to the computing device of the customer for embedding in a web site or an application, the code when embedded is configured to send the second information indicating the user interactions to the system.

17. The system of claim 15, wherein a portion of the first information identifying the user interactions is received from an external source independent of the customer.

18. The system of claim 15, wherein the user interactions are associated with an identifier of the computing device of the user, and wherein the identifier of the computing device of the user is shared between the analytics tool and the content tool.

19. The system of claim 15, wherein the instructions, upon execution by the one or more processors, cause the system to provide the application programming interfaces to update the analytics tool and the content tool and the internal communication bus to the platform to publish the second information identifying that the user is associated with the user segment.

20. The system of claim 19, the application programming interfaces are run at a time interval to update the analytics tool and the content tool based on a plurality of customer inputs, and wherein the second information identifying that the user is associated with the user segment is published in real time over the internal communication bus.

* * * * *